(12) United States Patent
Horikawa (10) Patent No.: US 8,340,075 B2
(45) Date of Patent: *Dec. 25, 2012

(54) METHOD FOR TRANSFERRING MPOA PACKET

(75) Inventor: Koichi Horikawa, Tokyo (JP)

(73) Assignee: Juniper Networks, Inc., Sunnyvale, CA (US)

( * ) Notice: Subject to any disclaimer, the term of this patent is extended or adjusted under 35 U.S.C. 154(b) by 2290 days.

This patent is subject to a terminal disclaimer.

(21) Appl. No.: 11/122,249

(22) Filed: May 5, 2005

(65) Prior Publication Data

US 2005/0286530 A1 Dec. 29, 2005

(30) Foreign Application Priority Data

Feb. 26, 1999 (JP) ...................................... 11-051991

(51) Int. Cl.
*H04L 12/28* (2006.01)
*G06F 15/173* (2006.01)

(52) U.S. Cl. ...................... 370/351; 370/392; 370/395.1; 370/395.54; 370/401; 709/238

(58) Field of Classification Search ............. 370/395.53, 370/395.54, 395.1, 397, 474, 389; 709/238
See application file for complete search history.

(56) References Cited

U.S. PATENT DOCUMENTS

| | | | |
|---|---|---|---|
| 5,309,437 A * | 5/1994 | Perlman et al. ................ | 370/401 |
| 5,467,349 A | 11/1995 | Huey et al. | |
| 5,809,233 A | 9/1998 | Shur | |
| 5,828,844 A | 10/1998 | Civanlar et al. | |
| 6,169,739 B1 | 1/2001 | Isoyama | |
| 6,172,991 B1 * | 1/2001 | Mori ............................. | 370/474 |
| 6,189,041 B1 | 2/2001 | Cox et al. | |
| 6,189,042 B1 * | 2/2001 | Keller-Tuberg ............... | 709/238 |
| 6,256,314 B1 | 7/2001 | Rodrig et al. | |
| 6,279,035 B1 * | 8/2001 | Brown et al. .................. | 709/224 |
| 6,304,912 B1 * | 10/2001 | Oguchi et al. ................ | 709/238 |
| 6,385,170 B1 * | 5/2002 | Chiu et al. .................... | 370/235 |

FOREIGN PATENT DOCUMENTS

| | | |
|---|---|---|
| CA | 2256937 | 6/1999 |
| JP | 5-199230 | 8/1993 |
| JP | 7-87121 | 3/1995 |
| JP | 10-154995 | 6/1998 |
| JP | 10-200533 | 7/1998 |
| JP | 10-229401 | 8/1998 |

(Continued)

OTHER PUBLICATIONS

Williams, A.; MPOA: routing multiple protocols over ATM, IP Routing Versus ATM Switching—What are the Real Issues? (Digest No: 1997/334, IEE Colloquium on, Nov. 19, 1997 pp. 2/1-2/5.*

(Continued)

*Primary Examiner* — Brandon Renner
(74) *Attorney, Agent, or Firm* — Harrity & Harrity, LLP (57) ABSTRACT

A method for transferring a packet that is capable of permitting address resolution based on layer 3 packet filter information and that is further capable of preventing establishing an undesirable short cut path is provided. In a network, a server that receives an address resolution request packet from a client determines if the address resolution request packet should be forwarded to another server or another client based on a layer 3 packet filter information.

12 Claims, 6 Drawing Sheets

FOREIGN PATENT DOCUMENTS

| | | |
|---|---|---|
| JP | 10-285168 | 10/1998 |
| JP | 11-32047 | 2/1999 |
| JP | 11-298484 | 10/1999 |

OTHER PUBLICATIONS

N. Mori et al., "Packet Filtering Method in MPOA Networks", The 1997 Signal Society B-7-40, Sep. 3-6, 1997, pp. 118 w/ abstract.

Chan Park et al., "Next Hop Resolution Using Classical IP Over ATM", $22^{nd}$ Annual Conference on Local Computer Networks, Proceedings Nov. 2-5, 1997, pp. 106-110.

Andy Williams, "MPOA: Routing Multiple Protocols Over ATM", *IP Routing Versus ATM Switching—What Are the Real Issues?* (Digest No: 197/334), IEEE Colloquium on Nov. 19, 1997, pp. 2/1-2/5.

Huang Ke et al., "The Flow Detection Protocol Design in Multiprotocol Over ATM", International Conference on Communication Technology, Proceedings Oct. 22-24, 1998, pp. 414-418, vol. 1.

* cited by examiner

| C | u | Type | Length |
|---|---|------|--------|
| Vendor ID ||| Sub ID |
| Sub ID | Sub Type || DSPA Len |
| Data Source Protocol Address ||||

| C | u | Type | Length |
|---|---|------|--------|
| DSPA Len || unused | Data Source Protocol Address |
| Data Source Protocol Address ||||

Fig. 7

METHOD FOR TRANSFERRING MPOA PACKET

RELATED APPLICATION

This application is a continuation of U.S. patent application Ser. No. 09/512,088 filed Feb. 24, 2000, the disclosure of which is incorporated herein by reference.

BACKGROUND OF THE INVENTION

1. Field of the Invention

The present invention relates to a method for transferring a Multi-Protocol Over Asynchronous Transfer Mode (hereinafter called MPOA) address request packet received by a conventional MPOA server to the other MPOA server or to the other MPOA client.

2. Background Art

The conventional Multi-Protocol Over Asynchronous Transfer Mode (hereinafter, called MPOA) is a communication mode used on a ATM network using existing protocols such as an Internet Protocol (IP), an Internetwork Packet Exchange (IPX), as specified by the version 1.0 (AF-MPOA-0087.00, ATM Forum).

However, in such a conventional packet transfer method, since a source layer 3 address of a data packet which is desired to be short cut is not included in the MPOA address resolution request packet, a problem has been encountered that, when the MPOA server receives the MPOA address resolution request packet, the MPOA server can not determine based on the layer 3 packet filter information whether or not the MPOA address resolution request packet is to be forwarded to the other MPOA server or the other MPOA client. Moreover, since the above-described source layer 3 address is not included, the MPOA server can not check whether or not it is the desired MPOA address resolution request. Thus, even when an address resolution request is transmitted from an MPOA client, triggered by a data communication from an undesired source, another problem encountered is that when such an MPOA address resolution request is processed by a normal procedure, there is a possibility that an undesirable short cut path will be established.

Figure 7:
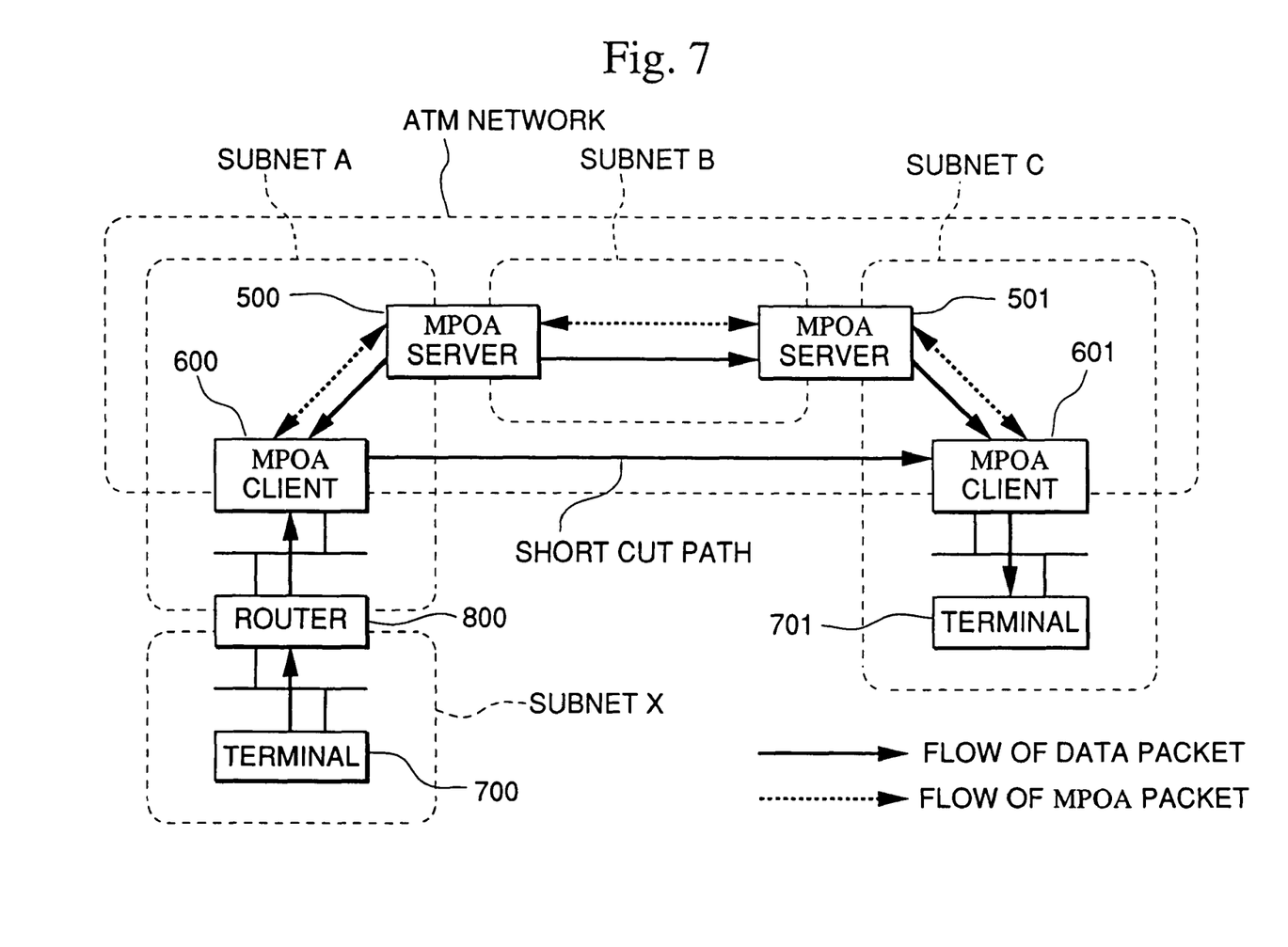
FIG. 7 is a block diagram showing the conventional MPOA packet transfer system.

For example, as shown in FIG. 7, it is assumed that the data communication is started from a terminal 700 to another terminal 701. If no layer 3 packet filter information is set in an MPOA server 500 or in another MPOA server 501, the data packet from the terminal 700 arrives at the terminal 701 through a router 800, an MPOA client 600, MPOA servers 500 and 501, and an MPOA client 601. When a data flow to the terminal 701 is detected at the MPOA client 600, the MPOA client 600 sends an MPOA address resolution request packet to the MPOA server 500. This MPOA address resolution request packet is forwarded through the MPOA servers 500 and 501 to the MPOA client 601, and the reply for the request packet is forwarded through the MPOA clients 601 and the MPOA servers 501 and 500, to the MPOA client 600, so that the MPOA client 600 learn the ATM address of the MPOA client 601. When a short cut path is established from the MPOA client 600 to the MPOA client 601, the data packet sent from the terminal 700 to the terminal 701 is forwarded through the terminal 700, the router 800, and the MPOA clients 600 and 601 to the terminal 701.

In contrast, if a rule such as "the data packet from a subnet X is not permitted to reach a subnet C" is configured, the data packet from the terminal 700 addressed to the terminal 701 will be discarded by the layer 3 function portion of the MPOA server 500 or 501 based on the layer 3 packet filter information, while if the MPOA client is not provided with a short cut path, the data packet from the terminal 700 is forwarded through the router 800 and the MPOA client 600 to the MPOA servers 500 and 501.

However, in that period, since a data flow to the terminal 701 is detected in the MPOA client 600, the MPOA client 600 sends an MPOA address resolution request packet to the MPOA server 500. This address resolution request packet is forwarded through the MPOA servers 500 and 501 to the MPOA client 601, and the reply for the request is forwarded through the MPOA client 601 and the MPOA servers 500 and 501 to the MPOA client 600, so that the MPOA client 600 can learn the ATM address of the MPOA client 601. Thereby, the MPOA client 600 establishes a short cut path to the MPOA client 601, and thereafter the data packet sent from the terminal 700 to the terminal 701 is forwarded through the terminal 700, the router 800, the MPOA clients 600 and 601, to the terminal 701. Consequently, a serious security problem arises that a data packet, which should be originally discarded, arrives at the terminal 701 through the short cut path developed by the above process.

SUMMARY OF THE INVENTION

It is therefore an objective of the present invention to provide a method capable of determining whether or not the address can be resolved based on the layer 3 packet filter information and capable of prohibiting establishment of an undesirable short cut path.

According to the first aspect, a method for transferring MPOA packets in an ATM network comprises a step for an MPOA server which has received an address resolution request packet from an MPOA client for determining whether or not said address resolution request packet is to be forwarded to the other MPOA server or the other MPOA client based on layer 3 packet filter information.

According to the second aspect, in the method for transferring MPOA packets according to the first aspect, the method comprises the step for said MPOA client of transmitting a source layer 3 address of the data packet that is to be a short cut by adding to an extension of the MPOA address resolution request packet, while the MPOA server determines whether or not said MPOA address resolution request packet is to be forwarded to the other MPOA server or the other MPOA client based on said source layer 3 address placed in the extension and the destination layer 3 address in the MPOA address resolution request packet received from said MPOA client, after being verified by the layer 3 packet filter information.

According to the third aspect, in the method for transferring MPOA packets according to the first apspect, the method comprising the step for said MPOA client of:

notification by the MPOA packet processor of the MPOA address resolution request operation and source layer 3 address information to the source layer 3 address extension processor;

judging by the source layer 3 address extension processor which has received the notification about whether or not the outer instruction directs that the source layer 3 address be included in the MPOA packet extension, and when the answer is yes, to make the MPOA packet extension include the source layer 3 address; and transmitting by the client MPOA packet transmitting portion the MPOA address resolution request packet with the MPOA packet extension added at said client MPOA packet processor to an MPOA server.

According to the fourth aspect, in the method for transferring MPOA packets according to the first aspect, the method comprising the step for said MPOA server of:

receiving by the MPOA packet receiving portion the MPOA address resolution request packet from said MPOA client;

checking by the server MPOA packet processor about whether or not the source layer 3 address is included in the received MPOA address resolution request packet, and when included, obtaining by the server MPOA packet processor the source layer 3 address and the destination layer 3 address;

retrieving by the layer 3 filter retrieving portion the layer 3 filter information using said source layer 3 address and the destination layer 3 address as the key, and judging by said server MPOA packet processor about whether or not to permit passing the filter; and directing the execution of error processing, when not permitted or directing the execution of processing for forwarding the received MPOA address resolution packet to the other MPOA server or the other MPOA client.

According to the fifth aspect, in the method for transferring MPOA packets according to the fourth aspect, the error processing is a process for transmitting the MPOA packet which indicates that the address resolution has been failed toward the MPOA client.

DETAILED DESCRIPTION OF THE INVENTION

First Embodiment

Hereinafter, the first embodiment of the present invention will be described with reference to attached drawings.

Figure 1:
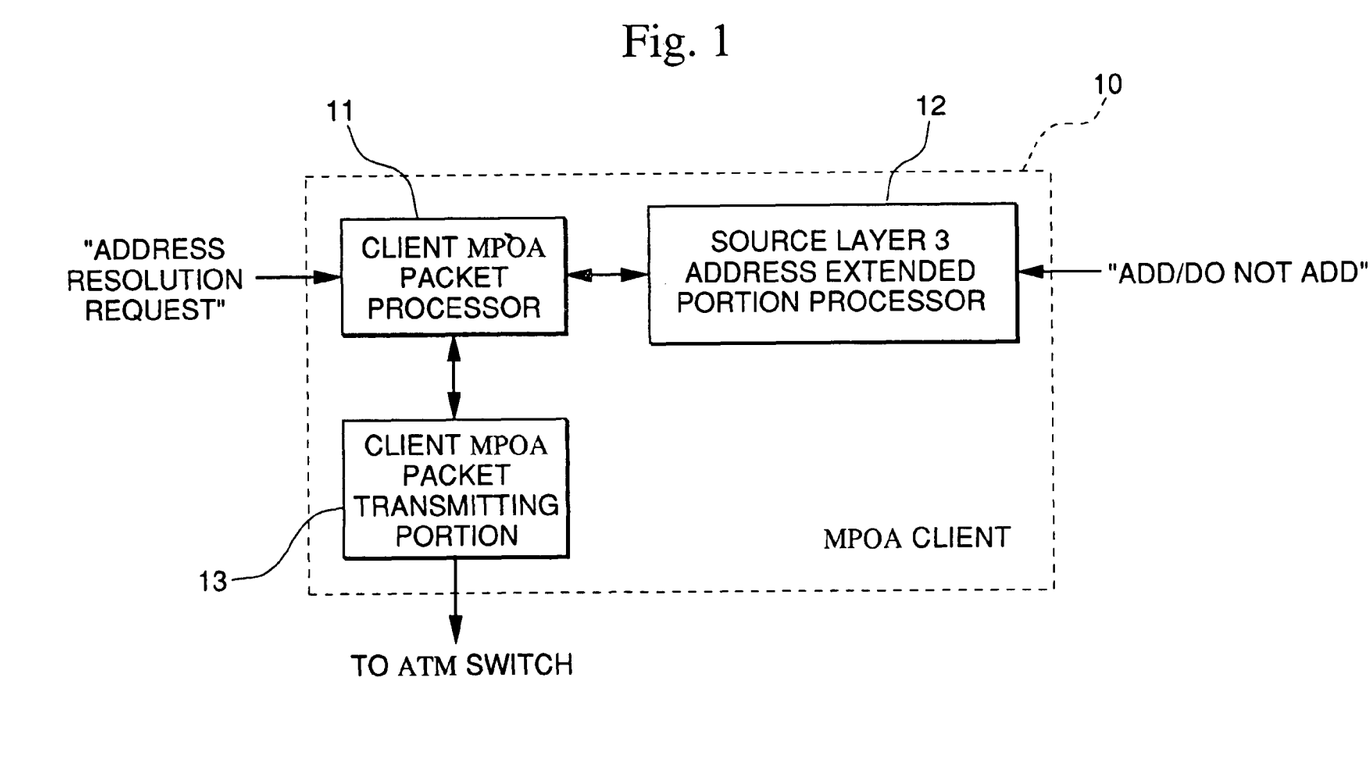
FIG. 1 is a block diagram showing a structure of the MPOA client that carries out a method of the present invention for transferring an MPOA packet.

FIG. 1 is a diagram showing a structure of an MPOA client for carrying out a method of the present invention for transferring an MPOA packet. The MPOA client comprises a client MPOA packet processor 11, a source layer 3 address extension processor 12, and a client MPOA packet transmitting portion 13, which are connected as shown in the FIG. 1. The client MPOA packet processor 11 functions so as to receive from the outside an instruction to start MPOA address resolution processing. The source layer 3 address extension 12 functions so as to be able to receive from the outside an instruction indicating whether or not the source layer 3 address is included in the extension of the MPOA packet.

Figure 2:
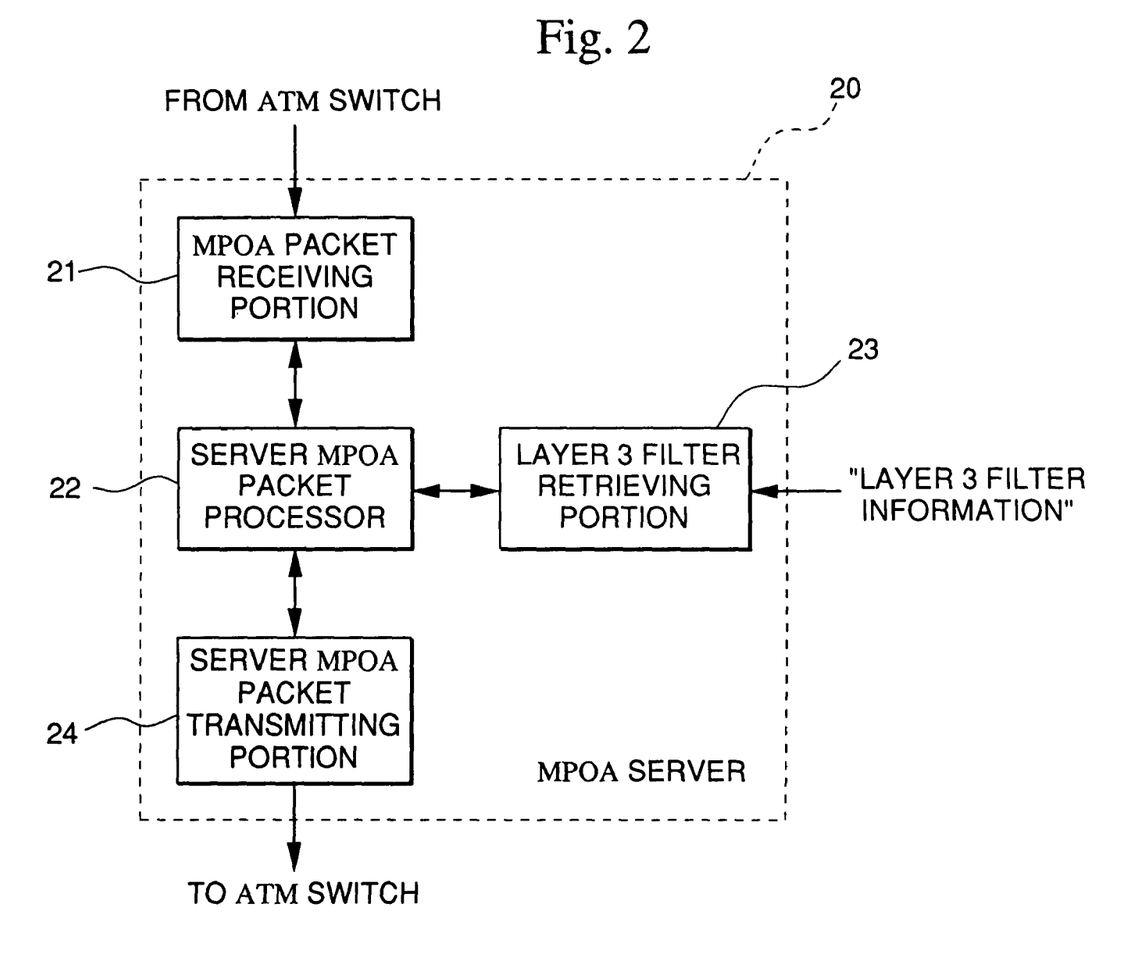
FIG. 2 is a block diagram showing a structure of an MPOA server that carries out a method of the present invention for transferring an MPOA packet.

FIG. 2 is a block diagram showing a structure of the MPOA server 20, which comprises an MPOA packet receiving portion 21, a server MPOA packet processor 22, a layer 3 filter retrieving portion 23, and a server MPOA packet transmitting portion 24, which are connected as shown in FIG. 2. The layer 3 filter retrieving portion 23 functions so as to receive from the outside the layer 3 filter information. Layer 3 filter information denotes information for determining whether or not a data packet is permitted to pass through, based on key factors of a source layer 3 address (or a subnet number) and a destination layer 3 address (or a subnet number). For example, information is such as "A data packet, in which the source layer 3 address belongs to the subnet X and the destination layer 3 address belongs to the subnet Y, is not permitted to pass through". This layer 3 filter information is suitably configured by an administrator of the MPOA server. It should be noted that FIGS. 1 and 2 only depict the portion for realizing the function of this invention, and other functional portions constituting the MPOA server or the MPOA client are not depicted.

Figure 3:
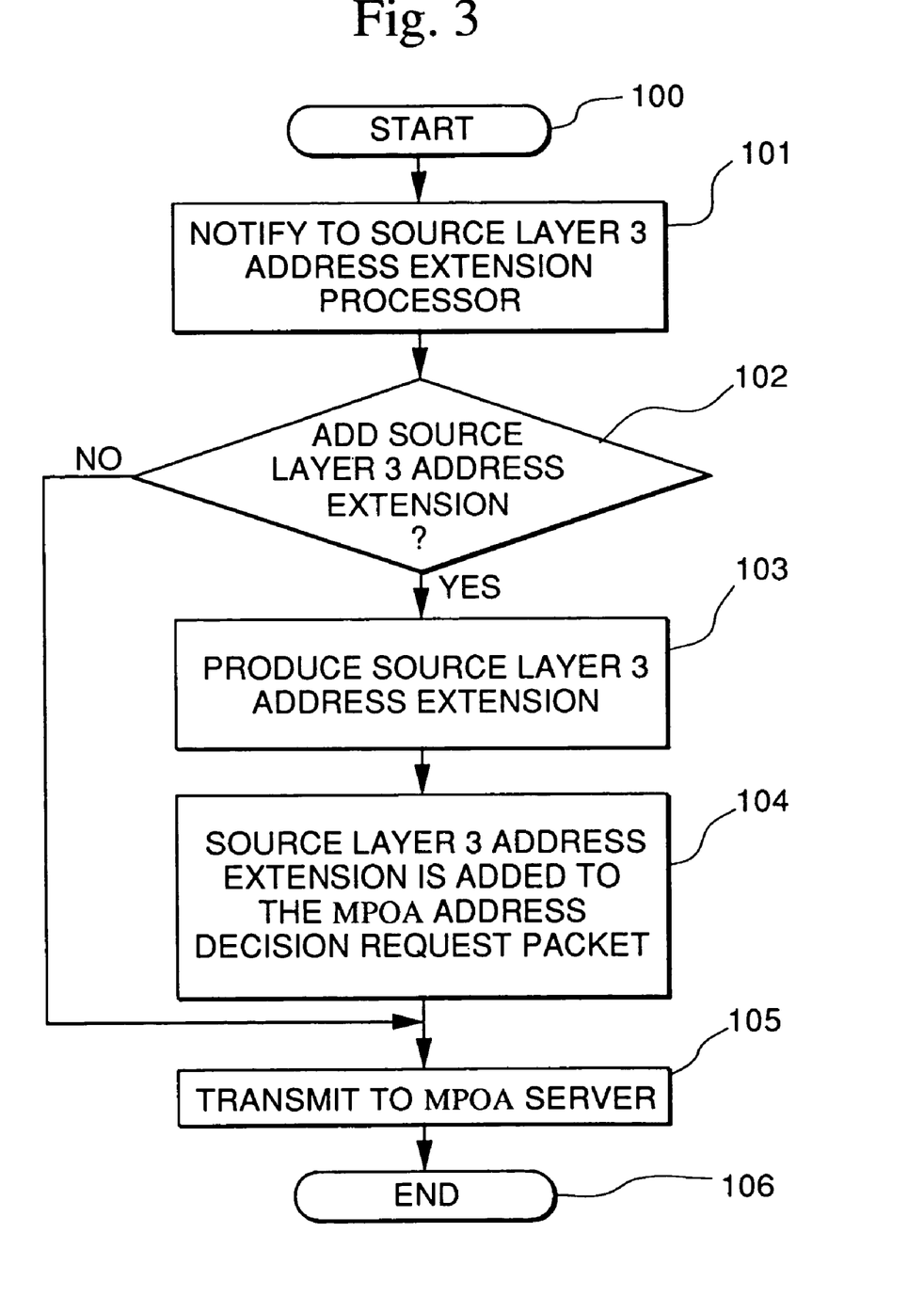
FIG. 3 is a flow chart showing operations of the MPOA client shown in FIG. 1.

Next, an operation is described in detail with reference to FIGS. 3 and 4. FIG. 3 shows a flow chart showing a procedure for processing data in the MPOA client. First, the client MPOA packet processor 11 starts the operation (Step 100) by an instruction from the outside (for example, an instruction from a functional portion which detects that the data packet is continuously transmitted), and notifies the source layer 3 address extension processor 12 to start an MPOA address resolution request operation. At this time, the source layer 3 address extension processor 12 (step 101) is informed of transmission layer 3 address information. The source layer 3 address extension processor 12 judges whether or not the outside instruction directs to include the source layer 3 address be included in the extension of the MPOA packet (step 102). It is also possible for a user to execute an instruction using any applicable commands.

When the result of the above judgement is that "the instruction directs that the source layer 3 address be included", the extension of the MPOA packet including the source layer 3 address is prepared (step 103), and the matter is notified to the client MPOA packet processor 11. The client MPOA packet processor 11 adds the extension of the MPOA packet prepared by the source layer 3 address extension processor 12 to the MPOA address resolution request packet (step 104). In contrast, when the result of the above judgement is that "the instruction directs that the source layer 3 address not be included", nothing is done. The client MPOA packet processor 11 delivers the MPOA address resolution request packet to the client MPOA packet transmitting portion 13, the client MPOA packet transmitting portion 13 transmits the MPOA address resolution request packet to the MPOA server (step 105), and the routine ends (step 106).

Figure 4:
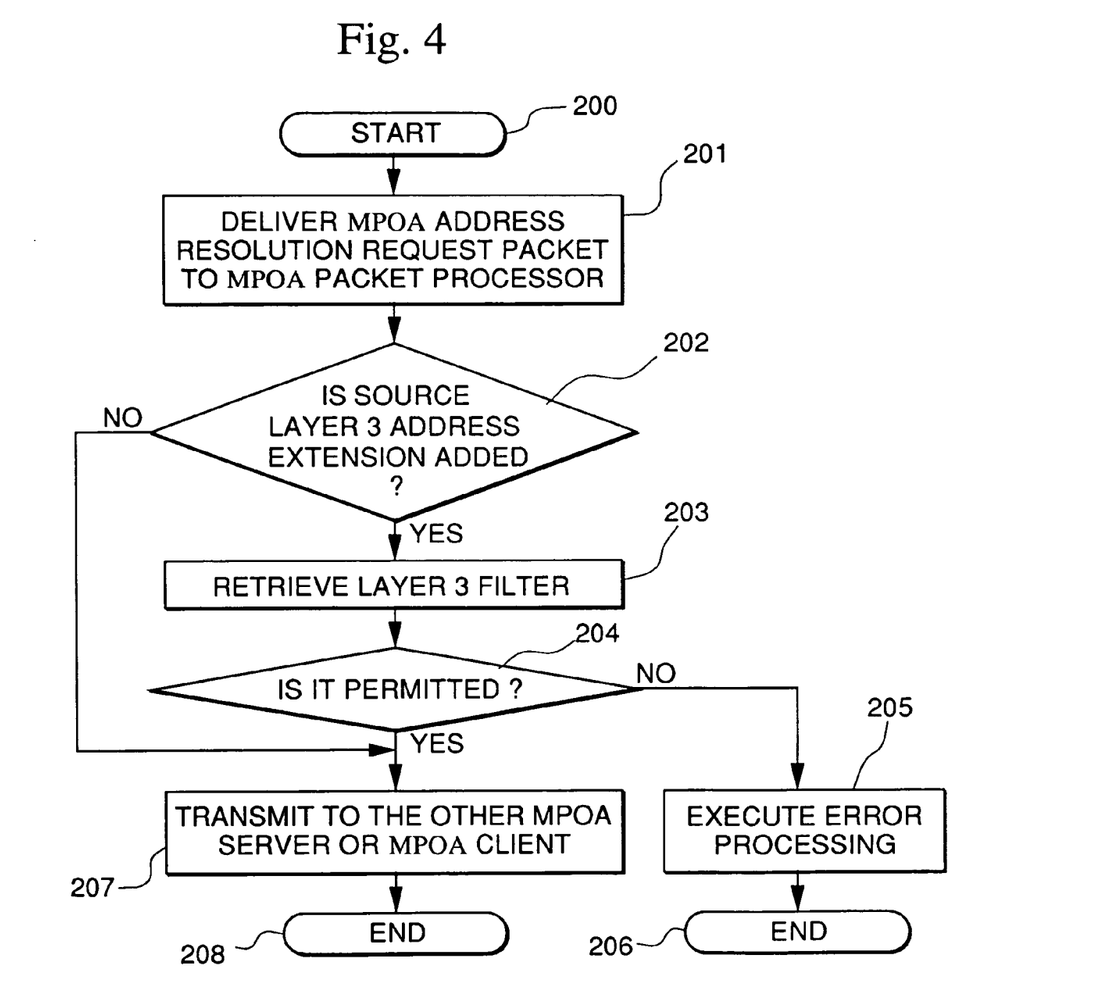
FIG. 4 is a flow chart showing operations of the MPOA server shown in FIG. 2.

Next, FIG. 4 shows a flow chart of a data processing procedure in the MPOA server. First, the procedure starts by receiving the MPOA address resolution request packet from the MPOA packet receiving portion 21 (step 200), and the MPOA packet receiving portion 21 delivers the MPOA address resolution request packet to the server MPOA packet processor 22 (step 201). The server MPOA packet processor 22 checks whether or not the source layer 3 address is included in the received MPOA address resolution request packet (step 202). When the check indicates that the source layer 3 address is included, the source layer 3 address and the destination layer 3 address which is an object of the address resolution are derived from the MPOA address resolution request packet for delivery to the layer 3 filter retrieving portion 23.

The layer 3 filter retrieving portion 23 retrieves the layer 3 filter information using those two received layer 3 addresses, determines whether or not passage through the filter is permissible (step 203), and the server MPOA packet processor 22 is informed of the result. The server MPOA packet processor 22 judges whether the information from the layer 3 filter retrieving portion 23 is "permissible" or "not permissible" (step 204). If "not permissible", error processing is executed and the routine ends (step 206). If the result is "permissible", processing is executed for forwarding the received MPOA address resolution request packet to the other MPOA server or the other MPOA client for delivery to the server MPOA packet transmitting portion.

If the judgement result in the above-described step 202 is that the source layer 3 address is not included, the received MPOA address resolution request packet is processed for forwarding to the other MPOA server or to the other MPOA client, and delivered to the server MPOA packet transmitting portion 24. The server MPOA packet transmitting portion 24 transmits the MPOA address resolution request packet received from the server MPOA packet processor 22 toward the other MPOA server or the other MPOA client (step 207) and the routine ends (step 208). The error processing described above is processing, for example, that transmits a MOPA packet indicating the failure of the address resolution to the MPOA client.

Figure 5:
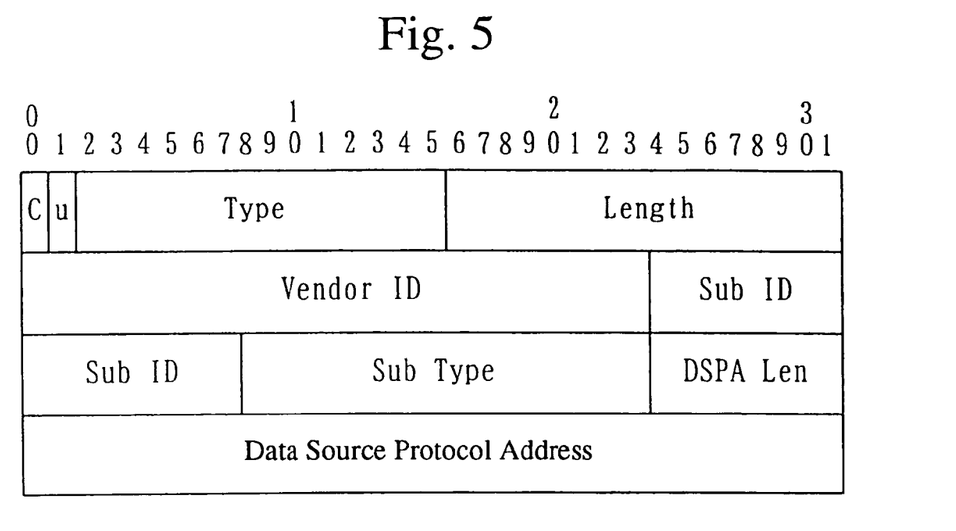
FIG. 5 is a format diagram showing an extension of the MPOA packet of the present invention for holding the source layer 3 address.

FIG. 5 shows examples of formats for the extension of the MPOA packet for holding the source layer 3 address. In this example, "Vendor Private Extension" of the MPOA control packet is used. The C field and u field are set 0. The Type field is set to 8 which indicates that this is the Vendor Private Extension. The Length field is set to a length from the Vendor ID field to the Data Source Protocol Address field in octet unit. The Vendor ID field is set to, for example, 119 (decimal number) which represents the NEC Corporation. The Sub ID field is set to a suitable number of a vendor for distinguishing a project or a model of the same vendor. The Sub Type field is set to a suitable function number of the present Vendor-Private Extension. In this case, a number is set to which represents the source layer 3 address extension. The DSPA Len field is set to a length of the source layer 3 address which is stored in the next Data Source Protocol Address field. The Data Source Protocol Address field is set to a source layer 3 address.

Even when an MPOA client provided with the functions of the present invention transmits an MPOA address resolution request packet with the addition of the source layer 3 address to an MPOA server which is not provided with the function of the present invention, the MPOA server can execute processing without any hindrance. This is because the source layer 3 address is held in the extension of the MPOA packet. In addition, the MPOA server having the function of this invention can execute processing without any hindrance even when it receives the MPOA address resolution request packet which is not provided with the function of the present invention.

Second Embodiment

Hereinafter, the second embodiment of the present invention is described. This embodiment is provided for the MPOA client in adding the source layer 3 address by defining a new "source layer 3 address extension" as the regular extension of MPOA instead of using "Vendor Private Extension". An example of the format of the extension is shown in FIG. 6.

Figure 6:
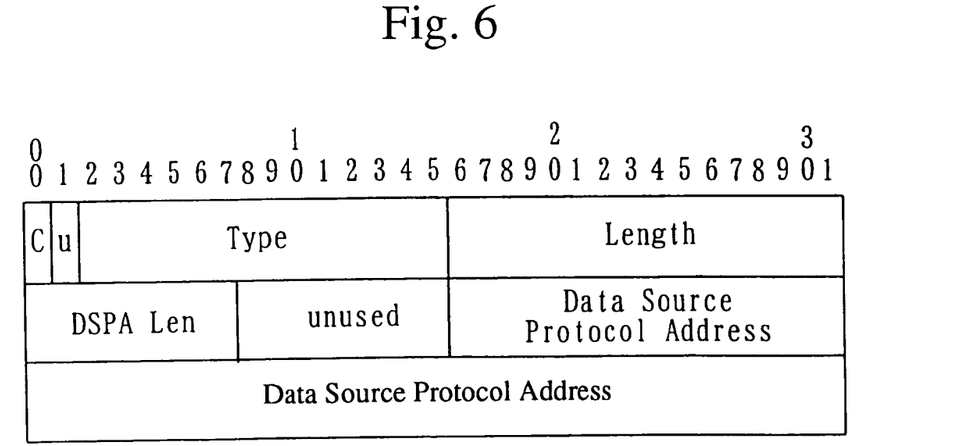
FIG. 6 is a format diagram showing the other extension of the MPOA packet of the present invention for holding the source layer 3 address.

As shown in FIG. 6, the C field and the u field are set to 0. The Type field is set to a value (for example, 100f (hexadecimal number)) representing that this is the extension of the source layer 3 address. The Length field is set to a length from the DSPA Len field to the Data Source Protocol Address field in octets. The DSPA Len field is set to a length of the source layer 3 address to be stored in the Data Source Protocol Address field. The unused field is set to 0. The Data Source Protocol Address field is set to a source layer 3 address. It is noted that the values shown above and the field names of the packets is not limited to the above examples and any numbers and names may be selected, and the present invention may be realized by software, firmware, or hardware.

As described above, the present invention shows the significant effect that, the source layer 3 address can be learned at each MPOA server since an MPOA client transmits an MPOA address resolution request packet with the source layer 3 address in the extension; thereby it is possible to determine whether or not the address resolution is permissible based on the layer 3 packet filter information at each MPOA server, using the source layer 3 address and the address of the data packet transferred practically through the short cut path. Furthermore, since the MPOA server permits the address resolution only when it is permitted by the layer 3 packet filter information, the security of the packet transfer is improved.

What is claimed is:

1. A method for forwarding a packet in a network, the method comprising:
   receiving, by a processor, an address resolution request packet;
   determining, by the processor, if the address resolution request packet is permitted to be forwarded;
   establishing, by the processor, a shortcut to a client device if a packet can be transmitted via the shortcut and the address resolution request packet is permitted to be forwarded; and
   forwarding, by the processor, the address resolution request packet to a destination if the address resolution request packet is permitted to be forwarded.

2. The method of claim 1, wherein the determining determines whether the address resolution request packet is to be forwarded based on layer 3 address information.

3. The method of claim 1, wherein the receiving further comprises:
   receiving, by the processor, an address resolution request packet including a source layer 3 address, where the source layer 3 address facilitates shortcutting the packet through the network.

4. The method of claim 1, wherein the determining if the address resolution request packet is permitted to be forwarded comprises:
   retrieving, by the processor, layer 3 filter information; and
   determining, by the processor, if the address resolution request packet is permitted to be forwarded based on the retrieved layer 3 filter information.

5. The method of claim 4, further comprising:
   providing, by the processor, a source layer 3 address associated with the address resolution request packet;
   providing, by the processor, a destination layer 3 address associated with the address resolution request packet; and
   processing, by the processor, the source layer 3 address and the destination layer 3 address to facilitate the determining if the address resolution request packet is permitted to be forwarded.

6. The method of claim 1, further comprising:
   identifying, by the processor, the destination as a client device or a server device.

7. The method of claim 1, wherein the determining if the address resolution request packet is permitted be forwarded further comprises:
informing, by the processor, a packet processor of a result of the determining; and
processing, by the processor, the address resolution request packet prior to the forwarding based on the result.

8. A method for transferring packets in a network via a shortcut, the method comprising:
receiving, by a device, a packet;
determining, by the device, if an address should be included in an address extension portion of a request packet;
adding, by the device, the address extension portion to the request packet if the address should be included in the address extension portion, the address extension portion for use by a destination to determine if the packet should be transmitted via the shortcut; and
transmitting, by the device, the packet via the shortcut if the address extension portion is present in the request packet.

9. The method of claim 8, further comprising:
receiving, by the device, an instruction from a device on the network to commence processing associated with the request packet.

10. The method of claim 9, wherein the receiving further comprises:
receiving, by the device, the instruction from a server.

11. The method of claim 8, wherein the determining further comprises:
producing, by the device, a result that includes an instruction; and
determining, by the device, that the address should not be included in the extension of the packet based on the instruction.

12. The method of claim 8, further comprising:
performing, by the device, an address resolution request operation on the request packet.

* * * * *

UNITED STATES PATENT AND TRADEMARK OFFICE
CERTIFICATE OF CORRECTION

| | | |
|---|---|---|
| PATENT NO. | : 8,340,075 B2 | Page 1 of 1 |
| APPLICATION NO. | : 11/122249 | |
| DATED | : December 25, 2012 | |
| INVENTOR(S) | : Koichi Horikawa | |

It is certified that error appears in the above-identified patent and that said Letters Patent is hereby corrected as shown below:

Add related U.S. application data on the cover page of the patent as follows:

item (63)   Related U.S. Application Data
Continuation of application No. 09/512,088 filed on Feb. 24, 2000, now U.S. Patent No. 6,915,349.

Signed and Sealed this
Nineteenth Day of February, 2013

Teresa Stanek Rea
*Acting Director of the United States Patent and Trademark Office*